United States Patent Office 3,468,812
Patented Sept. 23, 1969

3,468,812
METHODS OF PREPARING AN ALKALINE
EARTH HALOPHOSPHATE
Willem Lambertus Wanmaker, Dragutin Radielovic, and Age Hylke Hoekstra, Emmasingel, Eindhoven, Netherlands, assignors, by mesne assignments, to U.S. Philips Corporation, New York, N.Y., a corporation of Delaware
No Drawing. Filed July 13, 1966, Ser. No. 564,727
Claims priority, application Netherlands, July 24, 1965, 6509624
Int. Cl. C09k 1/36
U.S. Cl. 252—301.6                        6 Claims

ABSTRACT OF THE DISCLOSURE

In preparing antimony activated alkaline earth halophosphate phosphors, the antimony is introduced into the reaction mixture as an antimonite of either an alkaline earth metal, cadmium, or manganese.

---

The invention relates to a method of preparing trivalent antimony activated luminescent alkaline-earth halophosphates.

Trivalent activated alkaline earth halophosphates having an apatite structure are widely used for converting short-wave ultraviolet radiation into visible radiation, for example, in gas discharge lamps, particularly in low pressure mercury vapor discharge lamps.

The basic lattice of the above-mentioned apatites may be represented by the general formula $3M_3(PO_4)2MX_2$, where M is at least one of the alkaline earth metals and X is at least one of the halogens chlorine and fluorine. Compounds which contain only trivalent antimony as the activator emit blue light when excited by a short-wave ultraviolet radiation. Since for general illumination purposes, it is desirable that the luminescent substance emits substantially white light, bivalent manganese is frequently used as an activator in addition to the trivalent antimony.

To improve the luminous efficiency further, often a small quantity of cadmium is incorporated in the apatite lattice.

The preparation of the above-mentioned apatites is a particularly complicated process owing to the great number of components which are required to react with one another to form the apatite lattice with the correct quantity of activator incorporated therein. Therefore in the prior art, many different methods of preparing these phosphors are described. One of the most important objects in all these modes of preparation is to obtain a luminescent substance having the highest possible efficiency of the conversion of the ultraviolet radiation into visible radiation.

In these known methods the antimony is usually introduced into the reaction mixture as antimony trioxide. This reaction mixture may further contain a diversity of compounds for introducing the alkaline earth metals, the phosphate groups, the halogens, and if required, the manganese activator. It is very common to introduce the alkaline earth metals and the phosphate groups at least partly together as calcium hydrophosphate ($CaHPO_4$). If required, a quantity of calcium carbonate is introduced into the reaction mixture to bring the quantity of calcium to the correct value. The halogens are often introduced into the reaction mixture as halides of one or more of the alkaline earth metals or of ammonium. The manganese is often added as carbonate, oxalate and/or as manganese ammonium phosphate. If it is required that the final product also contains a small quantity of cadmium for example cadmium oxide or cadmium ammonium phosphate is introduced into the reaction mixture.

Dependent upon the compounds used in the reaction mixture, the firing temperature is chosen between 1000° C. and 1300° C., and the duration of heating is adapted accordingly.

In order to produce halophosphates having a high efficiency of light conversion, it is necessary when using antimony trioxide to very accurately control the method steps since otherwise products are obtained producing a luminescence of undesired color or having a low efficiency. In some cases, particularly when manganese is used also as an activator, products may be formed which have a non-white body color which is quite undesirable when used in lamps.

Another problem arising from the use of antimony trioxide originates from the fact that this oxide is rather volatile and also readily forms antimony trichloride with the halogens in the reaction mixture. This antimony trichloride is also very volatile at the temperatures required for the formation of the apatite. This results in the loss of considerable amounts of antimony. Only by controlling the reaction very accurately is it possible to uniformly obtain a final product in which the correct quantity of trivalent antimony is present. However, this is very difficult to achieve under factory conditions. By small variations in the conditions, for example, an uneven temperature distribution in the heating furnace, and/or in the reaction mixture, may cause a variable quantity of antimony trichloride to be formed and escape from the reaction mixture.

In order to overcome the drawbacks associated with the use of antimony trioxide it has already been proposed to use antimony pentoxide, antimony-tetroxide or alkaline earth antimonate. However, it has been found in practice, that when using the type of compounds, in which the antimony is at least partially pentavalent, the resultant phosphors exhibit a lower luminous efficiency than when using antimony trioxide. This results from the fact that the conversion of the pentavalent antimony to trivalent antimony during the preparation of the apatite, requires higher firing temperatures and longer firing times due to which undesired secondary reactions may occur. For example, in such a method when producing apatites which contain antimony and manganese as activators, purple colored manganese compounds are often formed.

A principal object of our invention is to provide a new and improved method of producing trivalent antimony activated alkaline earth halophosphate phosphors.

Another principal object of our invention is to provide a method of producing trivalent antimony activated alkaline earth phosphate phosphors of improved light output.

These and other objects of our invention will be apparent from the description that follows.

According to our invention we have unexpectedly found that the problems complicating the production of trivalent antimony activated alkaline earth phosphate having an apatite structure may be avoided by introducing the antimony at least partially as an antimonite of one or more of the alkaline earth metals, cadmium or manganese.

By the method of our invention not only is a phosphor of a higher luminous efficiency obtained than when using antimony trioxide, but the above drawbacks associated with the use of antimony trioxide are also avoided. Thus there is a lower loss of antimony which can result in a reduction of contamination of the furnace and makes it possible to more accurately estimate the quantity of antimony required. Thus a saving may be achieved in the amount of antimony compound required which results in a substantial reduction of the cost price of the phosphor. Finally, it has been found that a more homogeneous firing mass is obtained, which is very likely connected with a lower volatilisation of the antimony.

In a particularly favorable embodiemnt of a method according to the invention, first an unactivated or manganese-containing apatite is prepared in known manner. This apatite is then mixed with the desired quantity of antimonite, of one or more of the alkaline earth metals, manganese or cadmium and the resulting mixture heated at a temperature between 1000° and 1300° C., the ultimate luminescent apatite compound being formed. This method has the advantage in that the resultant phosphors in general exhibit a higher efficiency of light conversion.

In the method of our invention, calcium antimonite is preferably used, since this is a substance which can easily be prepared by heating a mixture of calcium oxide with antimony trioxide or a mixture of compounds which on heating, can produce calcium oxide and antimony-trioxide, for example, calcium carbonate, calcium oxalate and antimony phosphate, in a nonoxidizing atmosphere at a temperature between 700 and 1000° C. As a nonoxidizing atmosphere nitrogen is preferably chosen.

Other alkaline earth antimonites other than calcium antimonite may also be used, for example barium antimonite as well as strontium antimonite, also cadmium antimonite and manganese antimonite as well as mixtures of these compounds.

If in a method according to the invention cadmium antimonite is used, the final product contains a small amount of calcium in addition to the alkaline earth metals, which, as already stated, may give an increase of the luminous efficiency of the apatite in a fluorescent lamp.

In order that the invention may readily be carried into effect, it will now be described with reference to a number of examples.

EXAMPLE 1

|  | G. |
| --- | --- |
| $CaHOP_4$ | 710.19 |
| $CaCO_3$ | 200.64 |
| $CaF_2$ | 60.73 |
| $CaO.Sb_2O_3$ | 13.67 | are mixed and the mixture is heated in air at a temperature of 1140° C. for 2½ hours. The reaction mixture is then pulverized and again heated at 140° C. for 3½ hours. The resulting reaction product is pulverized and is then ready for use. When excited with ultraviolet radiation having a wavelength of 253.7 nm. blue light is emitted. The luminous efficiency is 105% compared with the luminous efficiency of a substance prepared in the same manner in which the antimony was added as antimony trioxide.

EXAMPLE 2

|  | G. |
| --- | --- |
| $CaHOP_4$ | 655.56 |
| $CaCO_3$ | 234.06 |
| $CaF_2$ | 55.54 |
| $MnNH_4PO_4$ | 23.61 |
| $NH_4Cl$ | 13.27 |
| $CaO.Sb_2O_3$ | 17.96 | are mixed and the mixture is heated in air at a temperature of 1140° C. for 4 hours. The reaction product of this heating is pulverized and is ready for use. When excited with radiation having a wavelength of 253.7 nm. white light is emitted having a color temperature of approximately 4200° K. The luminous efficiency is 109% compared with the luminous efficiency of a correspondingly prepared substance to which the antimony was added as antimony trioxide.

EXAMPLE 3

Instead of the mixture used in Example 2 a mixture may be used which consists of:

|  | G. |
| --- | --- |
| $Ca_2P_2O_7$ | 640.10 |
| $CaCO_3$ | 244.56 |
| $CaF_2$ | 58.03 |
| $MnNH_4PO_4$ | 24.67 |
| $NH_4Cl$ | 13.87 |
| $CaO.Sb_2O_3$ | 18.77 |

With this mixture the same result is otbained as with the mixture of Example 2.

EXAMPLE 4

|  | G. |
| --- | --- |
| $CaHPO_4$ | 630.80 |
| $CaCO_3$ | 234.45 |
| $CaF_2$ | 53.97 |
| $NH_4Cl$ | 13.15 |
| $MnNH_4PO_4$ | 49.74 |
| $CaO.Sb_2O_3$ | 17.89 | are mixed and the mixture is heated in air in a furnace at 1120° C. for 4 hours. The reaction product is pulverized and is then ready for use. When excited with radiation of a wave length of 253.7 nm. white light is emitted having a color temperature of approximately 3000° K. The luminous efficiency is 106% compared with the luminous efficiency of a substance prepared in a corresponding manner to which the antimony was added as antimony trioxide.

EXAMPLE 5

|  | G. |
| --- | --- |
| $CaHPO_4$ | 662.43 |
| $CaCO_3$ | 212.43 |
| $CaF_2$ | 54.61 |
| $MnCO_3$ | 16.43 |
| $NH_4Cl$ | 18.34 | are mixed and the mixture is preheated in open crucibles in air at 700° C. for 3 hours. The reaction product is pulverized and homogenized, 964.24 g. of the homogenized product are thereupon mixed with 35.76 g. of $2CdO.Sb_2O_3$ and the mixture is fixed in air in a furnace at 1140° C. for 3 hours. The reaction product is pulverized and is then ready for use. The luminous efficiency in 108% compared with the luminous efficiency of a substance prepared in a corresponding manner to which the antimony was added as antimony trioxide.

EXAMPLE 6

|  | G. |
| --- | --- |
| $CaHPO_4$ | 666.95 |
| $CaCO_3$ | 214.49 |
| $CaF_2$ | 54.89 |
| $MnCO_3$ | 16.45 |
| $NH_4Cl$ | 13.12 |
| $CaO.Sb_2O_3$ | 26.64 |
| $Sb_2O_3$ | 7.46 | are mixed and the mixture is heated in open crucibles in air at 1160° C. for 3 hrs. The reaction product is pulverized and the substance is then ready for use. The luminous efficiency is 107% compared with the luminous efficiency of a substance prepared in a corresponding manner to which all the antimony was added as antimony trioxide.

What we claim is:

1. In a method of preparing a luminescent trivalent antimony activated alkaline earth phosphate having an apatite structure by heating a reaction mixture of reactants capable of producing such phosphate at a temperature of from about 1000° C. to 1300° C. the improvement which comprises employing as the antimony reactant at least in part an antimonite of a metal selected from the group consisting of the alkaline earth metals, cadmiu and manganese.

2. The method of claim 1 wherein the reaction mixture contains bivalent manganese and the resultant luminescent material is activated also with bivalent manganese.

3. The method of claim 2 wherein the reaction mixture consists essentially of a manganese containing alkaline earth metal halophosphate of an apatite structure and an antimonite.

4. The method of claim 2 wherein calcium antimonite is employed.

5. The method of claim 4 wherein the calcium antimonite is prepared by heating a mixture of calcium oxide and antimony trioxide at a temperature of between about 700° C. and 1000° C. in a nonoxidizing atmosphere.

6. The method of claim 5 wherein the nonoxidizing atmosphere is nitrogen.

References Cited

UNITED STATES PATENTS 3,109,819 11/1963 Gillooly et al.

FOREIGN PATENTS 500,552 1/1951 Belgium.

TOBIAS E. LEVOW, Primary Examiner
R. D. EDMONDS, Assistant Examiner

U.S. Cl. X.R.
252—301.4

UNITED STATES PATENT OFFICE
CERTIFICATE OF CORRECTION

Patent No. 3,468,812    Dated September 23, 1969

Inventor(s) Willem Lambertus Wanmaker et al

It is certified that error appears in the above-identified patent and that said Letters Patent are hereby corrected as shown below:

Column 3, line 45, "140°C" should read -- 1140°C --.

Signed and sealed this 23rd day of June 1970.

(SEAL)
Attest:

Edward M. Fletcher, Jr.
Attesting Officer

WILLIAM E. SCHUYLER, JR.
Commissioner of Patents